United States Patent [19]

Yasui et al.

[11] 4,217,794

[45] Aug. 19, 1980

[54] LUBRICATING DEVICE FOR FINAL DRIVE GEARING OF POWER TRANSMISSION UNIT

[75] Inventors: Yasuyoshi Yasui; Makoto Uno, both of Toyota; Yoshio Sanui, Okazaki, all of Japan

[73] Assignee: Toyoda Jidosha Kogyo Kabushiki Kaisha, Aichi, Japan

[21] Appl. No.: 928,178

[22] Filed: Jul. 26, 1978

[30] Foreign Application Priority Data

Nov. 15, 1977 [JP] Japan .................. 52/153133[U]

[51] Int. Cl.² .......................................... F16H 37/08
[52] U.S. Cl. .............................................. 74/700; 74/467
[58] Field of Search ............... 74/467, 468, 700, 695, 74/701

[56] References Cited

U.S. PATENT DOCUMENTS

| | | | |
|---|---|---|---|
| 2,249,035 | 7/1941 | Peterson et al. | 74/700 |
| 2,426,593 | 9/1947 | Buckendale | 74/700 |
| 2,844,973 | 7/1958 | Hill | 74/700 |
| 2,890,772 | 6/1959 | Bixby | 74/700 X |
| 2,913,927 | 11/1959 | Issigonis | 74/700 X |
| 3,101,010 | 8/1963 | Popovich | 74/700 |
| 3,103,132 | 9/1963 | Burton | 74/700 X |
| 3,122,944 | 3/1964 | Boehner et al. | 74/700 |
| 3,494,225 | 2/1970 | Binder et al. | 74/700 |
| 3,545,568 | 12/1970 | Lacoste | 74/467 X |

FOREIGN PATENT DOCUMENTS

| | | | |
|---|---|---|---|
| 1129960 | 1/1957 | France | 74/700 |
| 912675 | 12/1962 | United Kingdom | 74/700 |
| 1003863 | 9/1965 | United Kingdom | 74/700 |

Primary Examiner—J. Franklin Foss
Attorney, Agent, or Firm—Armstrong, Nikaido, Marmelstein & Kubovcik

[57] ABSTRACT

A final drive gearing of a power transmission unit comprises a drive pinion shaft supported by a pair of axially spaced bearings carried on an upright partition wall of a trans-axle casing and a drive pinion integral with the drive pinion shaft and in mesh with a crown wheel for driving a differential gear unit. In the trans-axle casing, an axial cavity is provided on the partition wall adjacent the drive pinion shaft and opens toward the crown wheel to receive therein lubrication oil dipped up by rotation of the crown wheel, a lateral hole is provided through the partition wall to communicate the cavity into an annular space around the drive pinion shaft between the bearings, and a projecting rim is further provided on the partition wall for surrounding upper and side opening edges of the cavity to collect the lubrication oil into the cavity.

5 Claims, 6 Drawing Figures

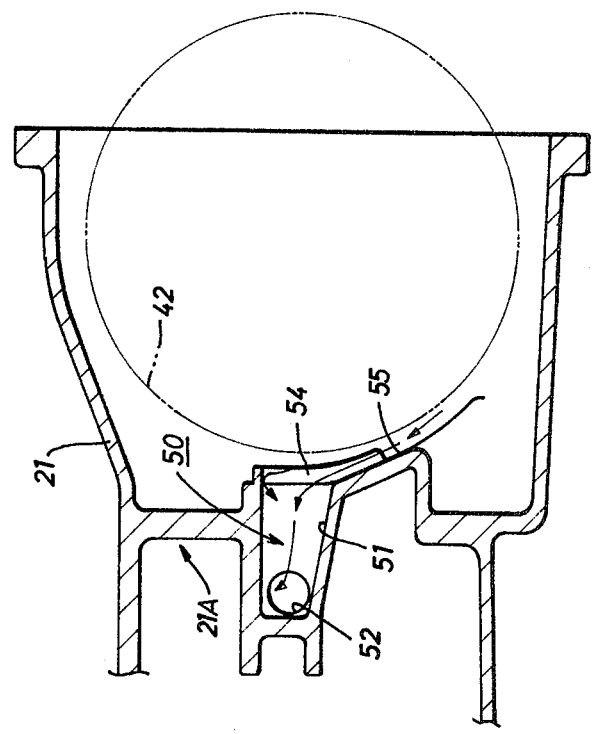
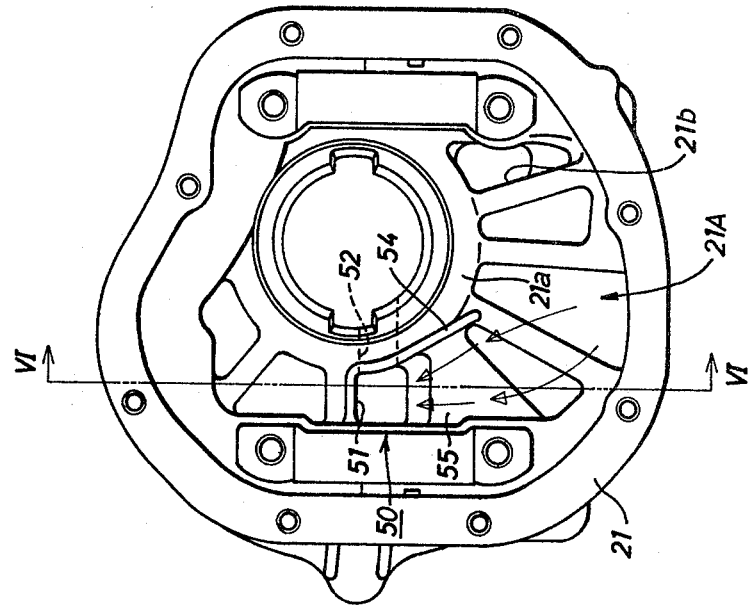

LUBRICATING DEVICE FOR FINAL DRIVE GEARING OF POWER TRANSMISSION UNIT

BACKGROUND OF THE INVENTION

The present invention relates generally to a power transmission unit for motor vehicles, and more particularly to a power transmission unit of the type which comprises a trans-axle casing rigidly secured at its upright front seating face to a cylinder block of an engine and having an upper compartment to contain therein a disengageable coupling for connection to a crankshaft of the engine and a lower compartment to contain therein a final drive gearing and a differential gear unit, and a transmission casing sealingly jointed at its upright front seating face to the upright rear seating face of the trans-axle casing to contain therein a change-speed gearing drivingly connected to an output shaft of the disengageable coupling, and in which the trans-axle casing is provided therein with an upright partition wall to subdivide the lower compartment into front and rear chambers, and the final drive gearing includes a drive pinion shaft supported by a pair of axially spaced bearings carried on the partition wall and a drive pinion integral with the drive pinion shaft located within the front chamber, the drive pinion shaft being coaxially connected to the change-speed gearing, and the drive pinion being meshed with a crown wheel to drive the differential gear unit.

In such a final drive gearing of the type as described above, the bearing facing to the front chamber is directly splashed with lubrication oil dipped up by rotation of the crown wheel, but the bearing facing to the rear chamber may not be splashed with the dipped up lubrication oil. It is, therefore, necessary to positively lubricate the latter bearing so as to ensure durability of the power transmission unit.

SUMMARY OF THE INVENTION

Accordingly, it is a primary object of the present invention to provide an improved power transmission unit in which both bearings for the drive pinion shaft are sufficiently lubricated by lubrication oil dipped up by rotation of the crown wheel, an which is relatively simple in structure and in economical to manufacture.

In a preferred embodiment of the present invention, the primary object is accomplished by providing a power transmission unit wherein an axial cavity is provided on the upright partition wall of the trans-axle casing adjacent the drive pinion shaft and opens toward the front chamber to receive therein lubrication oil dipped up by rotation of the crown wheel, and a lateral hole is provided through the partition wall to communicate the cavity into an annular space around the drive pinion shaft between the bearings, and wherein the upright partition wall is further provided with a projecting rim surrounding the upper and side opening edges of the cavity to collect the lubrication oil. Furthermore, the upright partition wall is preferably formed with an inclined guide surface which extends downward from the bottom opening edge of the cavity and is broader subjacent the outer periphery of the crown wheel to assist entrance of the lubrication oil into the cavity.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 5 is an enlarged front view showing an upright partition wall of the trans-axle casing of FIG. 2; and FIG. 6 is an enlarged sectional view taken along the plane of line VI—VI of FIG. 5.

DESCRIPTION OF THE PREFERRED EMBODIMENT

Figure 1:
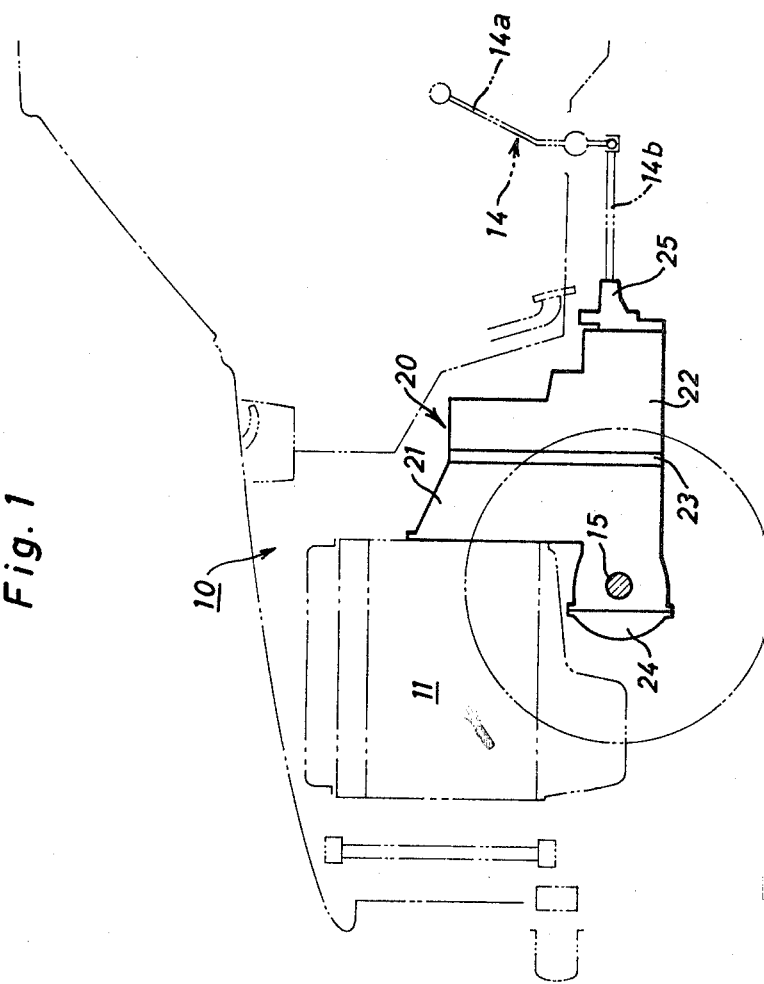
FIG. 1 is a schematic side view of a motor vehicle equipped with a power transmission unit in accordance with the present invention.
Figure 2:
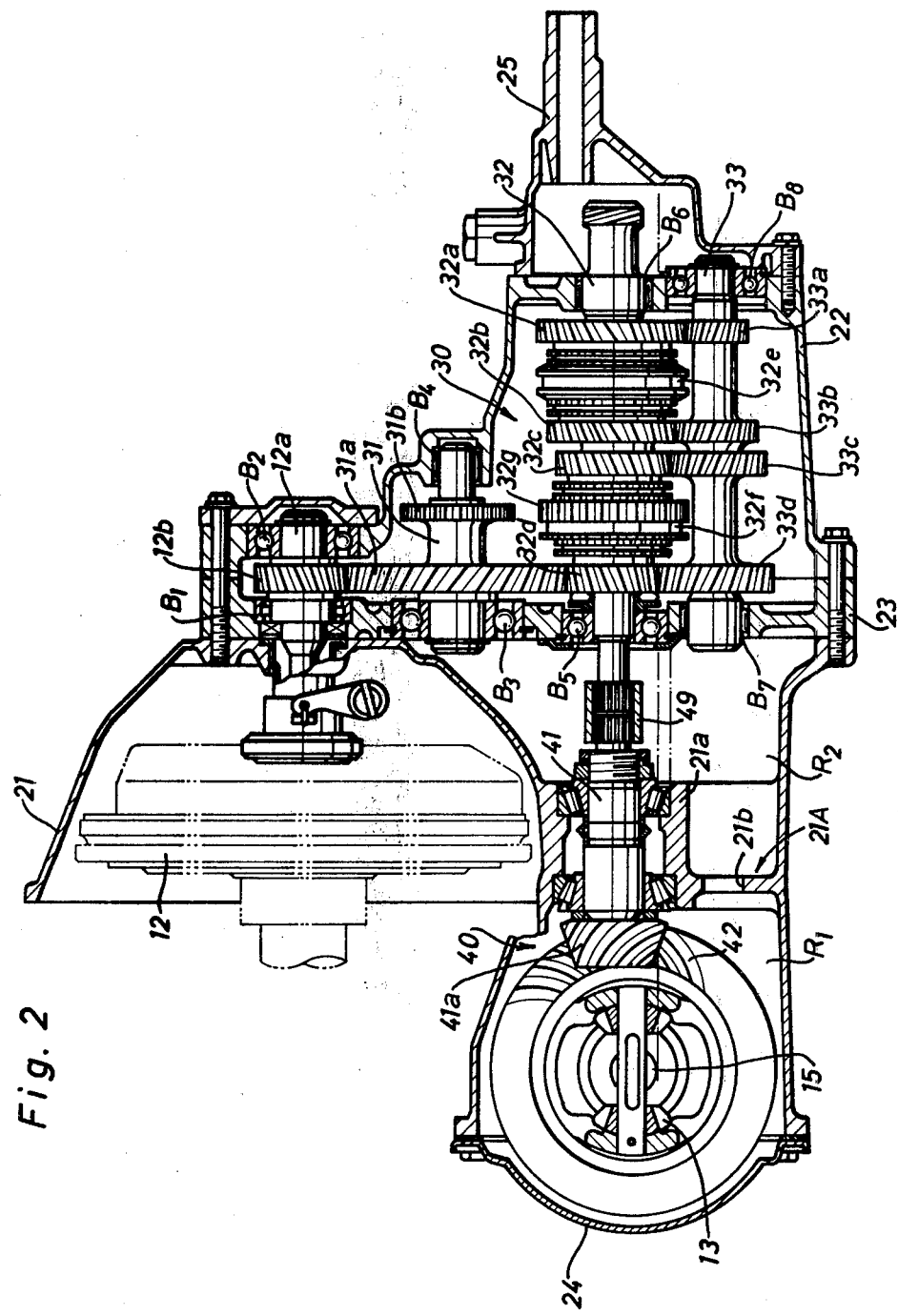
FIG. 2 is an enlarged sectional view of the transmission unit of FIG. 1.

Referring now to the drawings, in particular to FIG. 1, there is illustrated a power transmission unit which is mounted on a motor vehicle 10 of the type of front-engine and front-wheel drive. A housing assembly 20 for the transmission unit comprises a trans-axle casing 21 and a transmission casing 22 which are fluid-tightly jointed to each other by way of an upright intermediate plate 23. The trans-axle casing 21 is rigidly secured at its upright front seating face to an upright rear seating face of a cylinder block of an engine 11 and, as well shown in FIG. 2, is configured generally to conform with a friction clutch 12 contained in the upper compartment thereof and to conform with a final drive gearing 40 and a differential gear unit 13 contained in the lower compartment thereof. The lower compartment of the trans-axle casing 21 is sealingly closed by a dome-shaped cover plate 24 to retain lubrication oil within the housing assembly 20.

The transmission casing 22 is fluid-tightly secured at its upright front seating face to the upright rear seating face of the trans-axle casing 21 by way of the intermediate plate 23 and is configured generally to conform with a change-speed gearing 30 contained therein. The change-speed gearing 30 is drivingly connected at one hand thereof to the crankshaft of engine 11 through the friction clutch 12 and connected at the other hand thereof to the differential gear unit 13 through the final drive gearing 40. In addition, an extension housing 25 is fluid-tightly secured to the rear end seating face of the transmission casing 22 to complete the housing assembly 20.

The friction clutch 12 has a power input member for connection to the crankshaft of engine 11 and a power output member 12a supported by a pair of axially spaced journal bearings $B_1$ and $B_2$ respectively from the intermediate plate 23 and from the transmission casing 22. The power output member 12a is formed with a driving gear 12b located between the bearings $B_1$ and $B_2$ and is further surrounded by a seal member to keep foreign matter out of the casing 22 and to retain lubrication oil within the casing 22. An idler shaft 31 is supported by a pair of axially spaced bearings $B_3$ and $B_4$ respectively from the intermediate plate 23 and from the transmission casing 22 and is also formed with an idler gear 31a and a reverse driving gear 31b. The idler gear 31a is permanently meshed with the driving gear 12b on the power output member 12a, and the reverse driving gear 31b is axially spaced from the idler gear 31a and adjacent the right-hand bearing B4.

The change-speed gearing 30 includes an output mainshaft 32 which is supported by a pair of axially spaced bearings B5 and B6 respectively carried on the intermediate plate 23 and the transmission housing 22. The mainshaft 32 is provided thereon with an input gear or fourth gear 32d which meshes with the idler gear 31a of the idler shaft 31 and with a gear 33d integral with a countershaft 33. The countershaft 33 is also formed integral with three further gears 33a, 33b and 33c of differing sizes which are meshed respectively with first, second and third gears 32a, 32b and 32c journalled on the mainshaft 32. The selection of gear ratios is effected by a gear-shift mechanism 14 (See FIG. 1) which is operatively connected through a mechanical linkage 14b to a pair of synchronizers 32e and 32f.

When the first synchronizer 32e is in its neutral position, the first and second gears 32a, 32b are free from the mainshaft 32. The synchronizer 32e acts in the usual manner to establish synchronism in a driving connection between the mainshaft 32 and the first gear 32a or the second gear 32b, depending upon which direction the synchronizer 32e is shifted by an unshown first shift fork of the gear-shift mechanism 14. When the second synchronizer 32f is in its neutral position, the third and fourth gears 32c, 32d are free from the mainshaft 32. The synchronizer 32f acts in the usual manner to establish synchronism in a driving connection between the mainshaft 32 and the third gear 32c or the fourth gear 32d, depending upon which direction the synchronizer 32f is shifted by an unshown second shift fork of the gear-shift mechanism 14.

A reverse gear 32g is formed integral with the second synchronizer 32f and is arranged to be positioned in a common vertical plane with the reverse driving gear 31b when the synchronizer 32f is in its neutral position. If an unshown reverse idler gear is shifted by an unshown third shift fork of the gear-shift mechanism 14 under the neutral condition of synchronizer 32f, the reverse idler gear is brought into engagement with the gears 32b and 32g to establish a reverse torque delivery path between the clutch output member 12a and the mainshaft 32.

The countershaft 33 is supported by a pair of axially spaced bearings B7 and B8 respectively from the intermediate plate 23 and the transmission casing 22 and is located substantially at the same height above the ground level as the mainshaft 32 and in parallel with the same. In FIG. 2, the countershaft 33 is, however, illustrated at a position lower than the mainshaft 32 to clearly depict the meshing engagement of the gear transmission.

Figure 3:
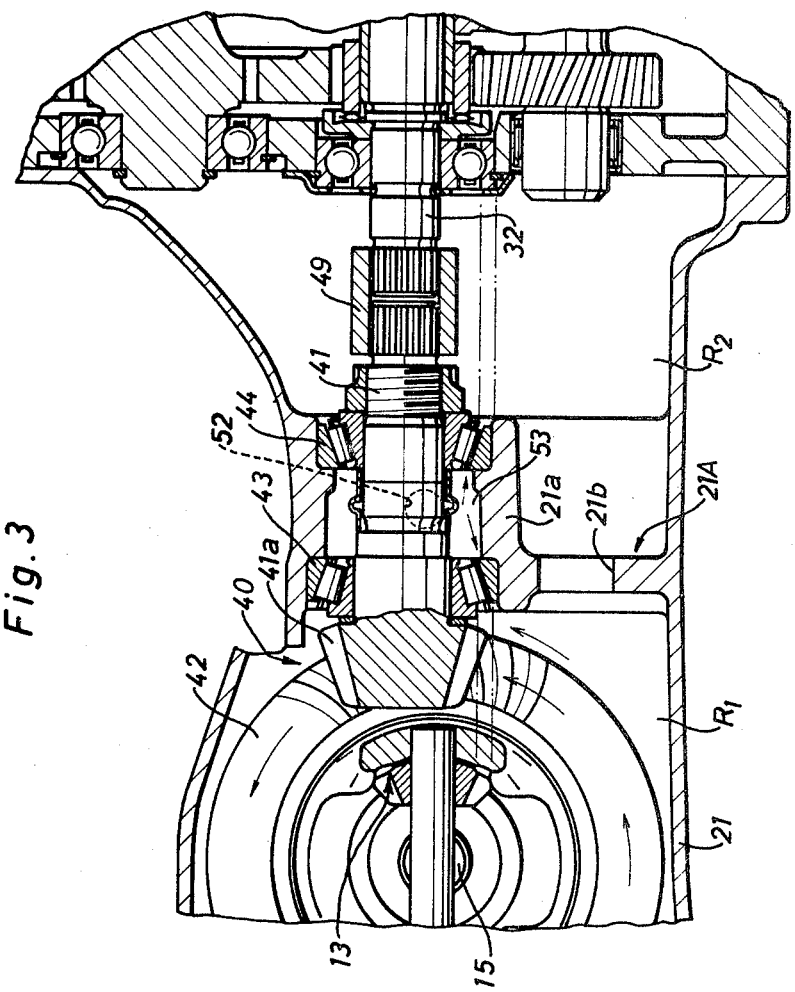
FIG. 3 is an enlarged sectional view of a final drive gearing shown in FIG. 2.
Figure 4:
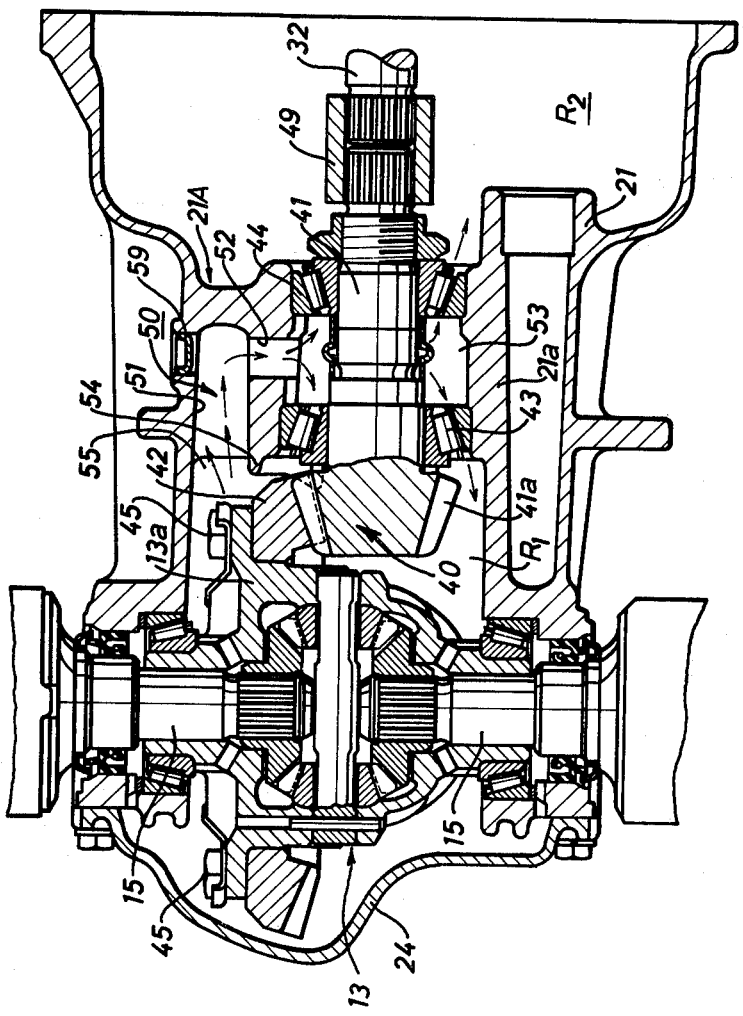
FIG. 4 is an enlarged horizontally sectional view of the final drive gearing of FIG. 3.

As well seen in FIGS. 2 to 4, the final drive gearing 40 has a drive pinion shaft 41 coaxially connected to the mainshaft 32 by means of a spline coupling 49, and the trans-axle casing 21 is provided therein with an upright partition wall 21A subdividing the lower compartment into front and rear chambers $R_1$ and $R_2$. The drive pinion shaft 41 is arranged along the fore-and-aft axis of the vehicle and is supported by a pair of axially spaced tapered roller bearings 43 and 44 carried on a bearing boss 21a of the upright partition wall 21A. A hypoid drive pinion 41a is formed integral with the drive pinion shaft 41 and is meshed with a hypoid crown wheel 42 within the front chamber $R_1$. As shown in FIG. 4, the hypoid crown wheel 42 is secured to a differential casing 13a of unit 13 by bolts 45 and is rotated by the hypoid drive pinion 41a in a counterclockwise direction, as shown in FIG. 3.

Hereinafter a lubricating device 50 in accordance with the present invention will be described in detail, particularly in reference to FIGS. 4 to 6. The lubricating device 50 comprises an axial cavity 51 adjacent the bearing boss 21a of upright partition wall 21A and a lateral hole 52 provided through the bearing boss 21a to communicate the cavity 51 into an annular space 53 around the drive pinion shaft 41 between the bearings 43, 44. The cavity 51 is arranged at the same side as the crown wheel 42 and opens toward the interior of front chamber $R_1$ to receive therein lubrication oil dipped up by rotation of the crown wheel 42. The lateral hole 52 serves to induct the lubrication oil from the bottom of cavity 51 into the annular space 53 thereby to lubricate both the tapered roller bearings 43 and 44. As shown in FIG. 5, the upright partition wall 21A is provided with a projecting rim 54 surrounding the upper and right-side opening edges of the cavity and extending under the bearing boss 21a. Thus, the projecting rim 54 is positioned adjacent the outer periphery of crown wheel 42, as shown in FIG. 6, and serves to collect the lubrication oil dipped up by rotation of the crown wheel 42. The upright partition wall 21A is also formed with an inclined guide surface 55 which extends downward from the bottom opening edge of the cavity opening and is broader subjacent the crown wheel 42 to assist entrance of the lubrication oil into the cavity 51.

The axial cavity 51, the projecting rim 54 and the inclined guide surface 55 are formed in casting process of the trans-axle casing 21, and the lateral hole 52 is formed by drilling through the trans-axle housing wall and is sealingly closed by a plug 59. Furthermore, the upright partition wall 21A is provided at its bottom portion with an axial through hole 21b communicating the front chamber $R_1$ into the rear chamber $R_2$. In addition, a predetermined amount of lubrication oil is stored within the bottom of the housing assembly 20 to dip therein lower portions of the crown wheel 42, the gears on the mainshaft 32, and the gears on the countershaft 33. In FIGS. 2 and 3, dot and dash lines indicate a liquid level of the lubrication oil during operation of the transmission unit, and two dots and dash lines indicate a liquid level of the lubrication oil under inoperative condition of the transmission unit.

In operation, assuming that a selected one of forward speed ratios in the change-speed gearing 30 is established by operation of the gear-shift mechanism 14, rotation torque from the engine 11 is conveyed to the driving gear 12b by way of the friction clutch 12 and then transmitted to the countershaft 33 by way of the idler gear 31a and input gear 32d. When the countershaft 33 is rotated, the first, second and third gears on the mainshaft 32 are rotated by engagement with the gears 33a, 33b and 33c on the countershaft 33 such that the mainshaft 32 is driven under the selected forward speed ratio. The rotation torque of mainshaft 32 is transmitted to the drive pinion shaft 41 through the spline coupling 49 and, in turn, the crown wheel 42 is rotated in a counterclockwise or forward direction by engagement with the drive pinion 41a of shaft 41 to drive a pair of wheel axles 15 through the differential gear unit 13.

Then, the lubrication oil is stirred up by rotation of the respective gears on the mainshaft 32 and the countershaft 33 and is also dipped up by rotation of the crown wheel 42 in the front chamber $R_1$, as shown by arrows in FIG. 3. Thus, the dipped-up lubrication oil directly splashes onto the roller bearing 43 and is guided by the projecting rim 54 and the inclined guide surface 55 to flow into the cavity 51 of partition wall 21A, as shown in FIGS. 5 and 6. Further, the lubrication oil in cavity 51 flows into the annular space 53 through lateral hole 52 to lubricate both the tapered roller bearings 43 and 44. Then, the lubrication oil passing through the bearing 43 returns into the front chamber $R_1$, while the lubrication oil passing through the bearing 44 flows into the rear chamber $R_2$ and returns into the front chamber $R_1$ through the communication hole 21b.

When the reverse torque delivery path is established by operation of the gear-shift mechanism 14, the reverse driving gear 31b is coupled with the reverse gear 32b by way of the reverse idler gear to rotate the mainshaft 32 in a reverse direction. This results in clockwise rotation of the crown wheel 42 in front chamber $R_1$. In this instance, although the lubrication oil flowing into the cavity 51 is partly prevented by the projecting rim 54, it will be noted that lubrication of the roller bearings 43, 44 may be ensured taking into account low rotation speed of the drive pinion shaft 41 and low frequency of usage in the reverse drive.

Although the lubricating device 50 of the embodiment includes the cavity 51 opening toward front chamber $R_1$ and the lateral hole 52 communicating the bottom of cavity 51 into the annular space 53, it should be noted that various modifications may be made without departing from the spirit of the present invention and the scope of the appended claims. Furthermore, it will be noted that the present invention may be adapted to a motor vehicle of the type of rear-engine and rear-wheel drive.

What is claimed is:

1. In a power transmission unit for a motor vehicle comprising: a trans-axle casing for connection at its upright front seating face to a cylinder block of an engine and at its upright rear seating face to a transmission casing for change-speed gearing means, said trans-axle casing having an upper compartment for containing a disengageable coupling for connection to a crankshaft of said engine and a lower compartment, the lower compartment being provided with an upright partition wall to subdivide the compartment into front and rear chambers; and a final drive gearing means and a differential gear means located within the lower compartment, said final drive gearing means including a drive pinion shaft supported by a pair of axially spaced tapered roller bearings carried on said partition wall and a drive pinion integral with said drive pinion shaft and located within the front chamber, said drive pinion shaft being coaxially connected to said change-speed gearing means in the rear chamber, and said differential gear means being arranged in front of said drive pinion and including a crown wheel driven by said pinion;

the improvement wherein said partition wall is formed therein with an axial cavity at one side of said drive pinion shaft and opening toward the front chamber to receive lubricating oil picked up by said crown wheel and a lateral hole communicating said cavity into an annular space around said drive pinion shaft between said bearings to permit the lubricating oil to pass through both said bearings toward the front and rear chambers, said partition wall being formed with a projecting rim which extends around the upper and side edges of said cavity opening, and an inclined guide surface which extends downwardly from the lower edge of said cavity opening and is broader below the outer periphery of said crown wheel, and said partition wall being further provided at the bottom portion thereof with an aperture interconnecting the front and rear chambers.

2. A power transmission unit as claimed in claim 1 wherein said aperture is located at the opposite side of said cavity to prevent the lubricating oil directly flowing into the rear chamber from the front chamber during rotation of said crown wheel.

3. A power transmission unit as claimed in claim 1 including plug means for sealing said lateral hole at the outer end thereof, said lateral hole having been formed by drilling through said trans-axle casing.

4. A power transmission unit as claimed in claim 1 wherein said projecting rim extends under said drive pinion shaft and is positioned adjacent to the outer periphery of said crown wheel.

5. A power transmission unit as claimed in claim 1 wherein said projecting rim and said inclined guide surface are formed during the casting of said trans-axle casing.

* * * * *

UNITED STATES PATENT AND TRADEMARK OFFICE
CERTIFICATE OF CORRECTION

PATENT NO. : 4,217,794

DATED : August 19, 1980

INVENTOR(S) : Yasuyoshi Yasui et al.

It is certified that error appears in the above-identified patent and that said Letters Patent is hereby corrected as shown below:

On the cover page, Item 73, "Toyoda" should read --Toyota--.

Signed and Sealed this

Twelfth Day of July, 1988

Attest:

DONALD J. QUIGG

Attesting Officer

Commissioner of Patents and Trademarks